Jan. 5, 1954 — E. PELL — 2,665,401
CONTROL SYSTEM FOR ELECTRIC MOTORS
Filed July 19, 1951 — 2 Sheets-Sheet 1
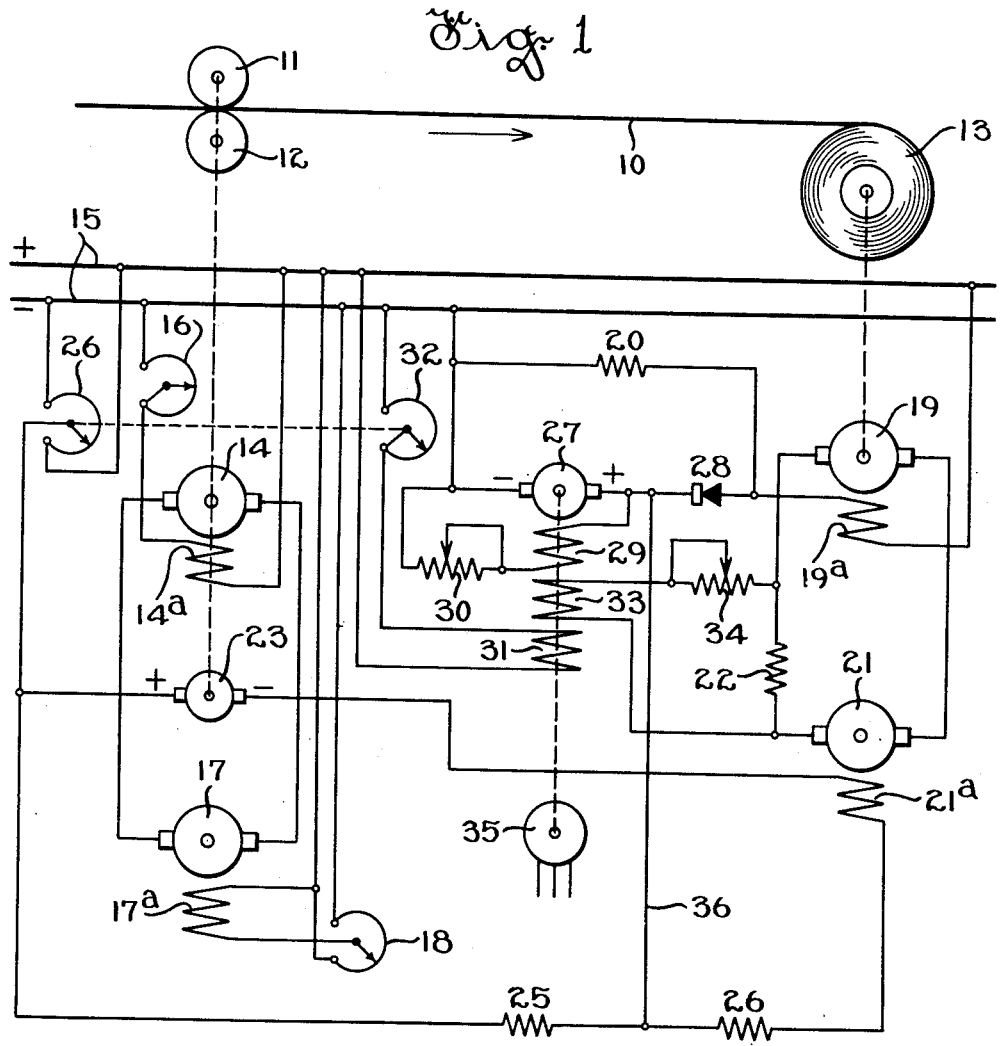
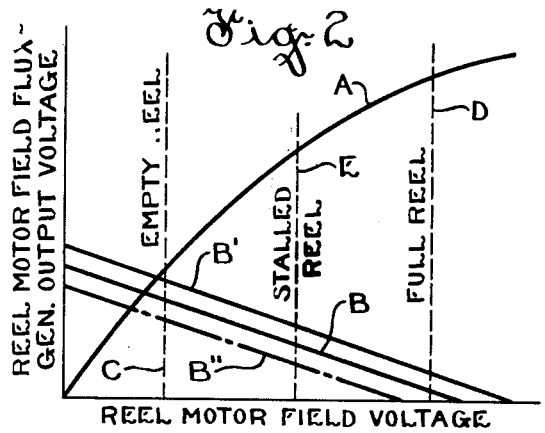
Inventor
Eric Pell
By W. C. Lyon
Attorney

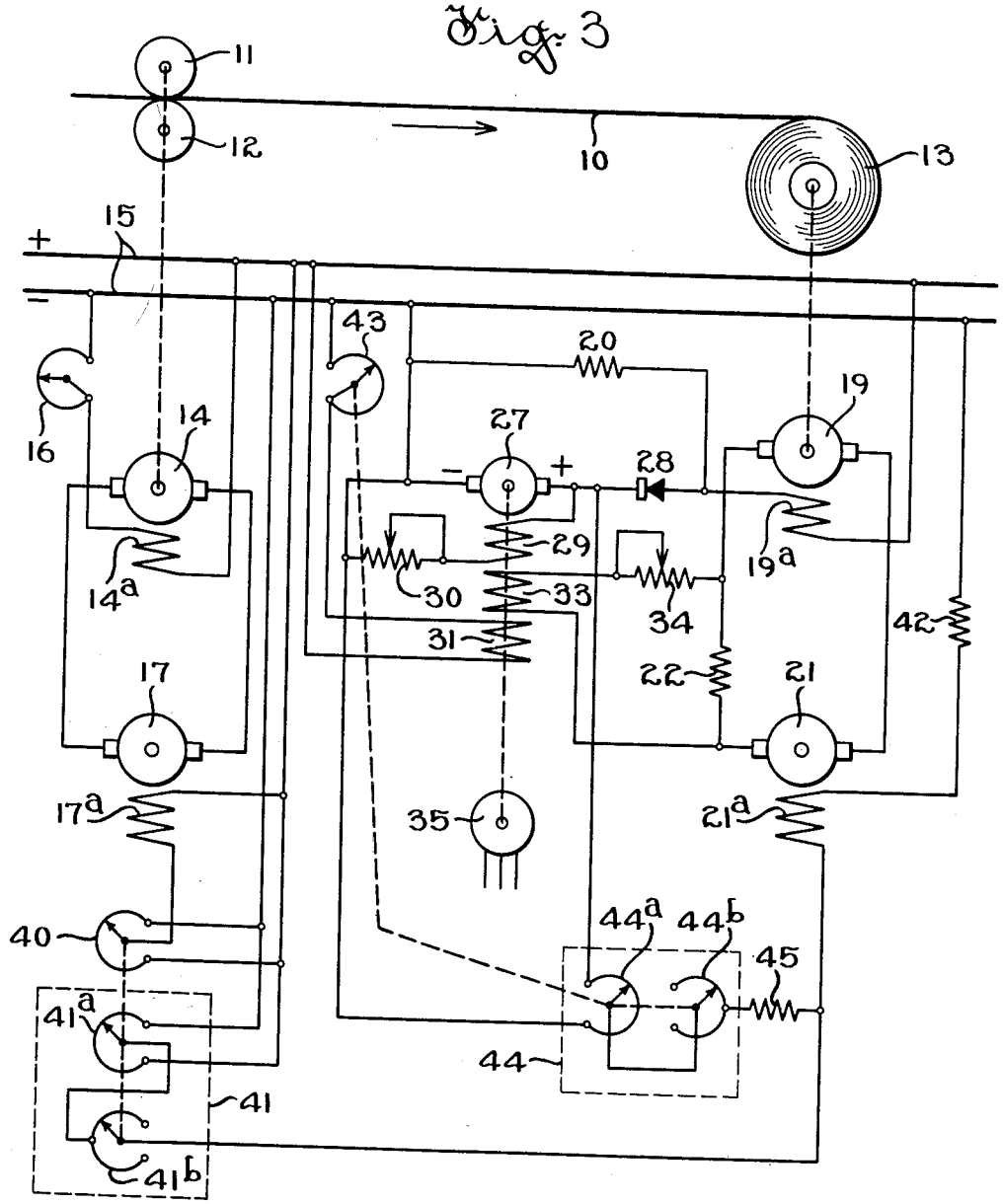

Patented Jan. 5, 1954

2,665,401

UNITED STATES PATENT OFFICE 2,665,401

CONTROL SYSTEM FOR ELECTRIC MOTORS

Eric Pell, Shorewood, Wis., assignor to Cutler-Hammer, Inc., Milwaukee, Wis., a corporation of Delaware Application July 19, 1951, Serial No. 237,544

8 Claims. (Cl. 318—7)

This invention relates to a control system for electric motors, and more particularly to a stalled tension control system for reeling motors.

The processing of long strips of sheet metal usually entails coiling up of the strip on a reel driven by an electric motor. Such reel motors are commonly regulated to constant current by a regulator which regulates the strength of the reel motor field to increase the field strength as the reel diameter increases, and vice versa, to thus provide constant motor C. E. M. F. and constant horsepower for a given linear speed of the strip. However, at or near zero speed of the reel motor its C. E. M. F. reverts to zero regardless of field strength, and in such speed region it is necessary to provide some other means of regulating the reel motor current to insure maintenance of stalled tension on the strip. One common way of achieving control of the motor current in this speed region is to employ a reel generator having two fields, one of which is energized in proportion to the speed of the mill driving motor, and the other of which, deemed an auxiliary field, is controlled by the reel motor current regulator in connection with the reel motor field. Another common system employes a reel generator with a single field and a booster in series with the armature of this generator having a field controlled by the reel motor current regulator.

It is a primary object of the present invention to provide improved control systems affording constant current regulation of a reel motor in the zero speed region employing the reel motor current regulator to regulate, in conjunction with the reel motor field, the field strength of a reel generator having a single field, thereby eliminating the need for a two field reel generator and/or a series booster.

Another object is to provide systems of the aforementioned character wherein the single field of the reel generator is excited proportionately to the speed of the mill motor and the output of the reel motor current regulator, and A still further object is to provide improved regulator response through employment of a reel generator having a single field winding.

Other objects and advantages of the invention will hereinafter appear.

The accompanying drawings illustrate certain preferred embodiments of the invention which will now be described, it being understood that the embodiments illustrated are susceptible of various modifications in respect of details without departing from the scope of the appended claims.

In the drawings,

Figure 1 is a diagrammatic showing of a reeling mechanism together with a control system therefor;

Fig. 2 is a graph depicting certain operating relationship in the system of Fig. 1, and Fig. 3 is a diagrammatic showing of a reeling mechanism together with a modified form of control system therefor.

Referring to Fig. 1, it shows a length of material 10, such as a strip of steel, passing through mill work rolls 11 and 12 in the direction of the arrow and being coiled up on a wind-up reel 13.

The mill work rolls 11 and 12 are driven by a direct current motor 14 having a separately excited field winding 14a. Field winding 14a is connected across opposite sides of a source of constant direct current voltage 15 in series with a rheostat 16. Power is supplied to the armature of motor 14 by an adjustable voltage generator 17, the armature of which is connected in a closed loop with the armature of motor 14. Generator 17 is provided with a separately excited field winding 17a which is connected at one end to one side of source 15 and at its other end to an adjusting element of a potentiometer rheostat 18 which has its resistance element connected across opposite sides of source 15. Generator 17 may be assumed to be driven at substantially constant speed by any suitable driving means (not shown).

The wind-up reel 13 is driven by a direct current motor 19 having a separately excited field winding 19a. Field winding 19a is connected across the source 15 in series with a resistor 20. Power is supplied to the armature of motor 19 by an adjustable voltage generator 21, the armature of which is connected in a closed loop with the armature of motor 19 in series with a resistor 22. Generator 21 is provided with a separately excited field winding 21a, which at one end is connected to one terminal of a tachometer generator 23 in series with resistors 24 and 25, and at its other end is directly connected to the other terminal of tachometer generator 23. Tachometer generator 23 is driven by the shaft of motor 14.

The point common between the first mentioned terminal of tachometer generator 23 and resistor 25 is connected to the adjusting element of a potentiometer rheostat 26 which has its resistance element connected across the source 15.

A bucking exciter 27 has its output terminals connected across resistor 20 in shunt relation in series with a blocking rectifier 28. Exciter 27 constitutes a well-known form of current regulator for motor 19 and according to its output acts to vary the excitation of field winding 19ᵃ of the motor by counteracting the excitation afforded by the supply source 15. When the output of exciter 27 is high, its bucking action is correspondingly high and as a result the excitation of field winding 19ᵃ of motor 19 is low. The bucking action of exciter 23 reaches a maximum value, which because of blocking rectifier 28 cannot be exceeded when its output equals the voltage across the resistor 20. Conversely, when the output of exciter 27 is low, its bucking action will be low and accordingly the excitation of field winding 19ᵃ of motor 19 will be high.

Exciter 27 is provided with a self-excited field winding 29 connected across its terminals in series with an adjustable resistor 30, which winding supplies the necessary ampere turns for maintaining the field of the exciter at any point within its regulating range. Exciter 27 is also provided with a reference field winding 31 which at one end is connected to one side of source 15 and at its other end is connected to the opposite side of source 15 in series with the resistance element of a rheostat 32. Rheostat 32 preferably has its adjusting element mechanically coupled with the adjusting element of rheostat 26. Exciter 27 is further provided with a signal field winding 33 which is connected across a load resistor 22 in series with an adjustable resistor 34. Exciter 27 may be assumed to be driven at constant speed by a motor 35. The point common to the high potential terminal of exciter 27 and the low potential terminal of rectifier 28 is connected through a conductor 36 to the point common between resistors 24 and 25.

The operation of the system of Fig. 1 will now be described.

Let it be assumed that motor 14 is operating at some preset speed as determined by the adjustment of rheostats 16 and 18, and that the material 10 is advancing to wind-up reel 13 at a corresponding constant linear speed. It will be observed that tachometer generator 23 will have some constant output voltage, and that winding 21ᵃ of generator 21 will be subjected to an excitation voltage which is proportional to the output voltage of tachometer generator 23. As the diameter of the material 10 on reel 13 increases, the armature of motor 19 tends to draw increased current and exciter 27 functions in a well known manner to increase the strength of the field 19ᵃ. Such increase in strength of field 19ᵃ results in increase in the C. E. M. F., and hence a correction in the armature current of motor 19. As a result, motor 19 is permitted to slow down progressively with increase in diameter of the material 10 on reel 13 to maintain constant horsepower output to reel 13.

Now let it be assumed that at the end of a processing operation motor 14 is decelerated to rest, as by adjustment of rheostat 18 to decrease the excitation of winding 17ᵃ of generator 17 to zero. As motor 14 slows down to rest, the output voltage of tachometer generator 23 will progressively decrease to zero, thus tending to decrease to zero the excitation of winding 21ᵃ of generator 21. The output voltage of generator 21 thus tends to disappear, causing a decrease in the reel motor current and voltage drop across resistor 22. The excitation of signal field winding 33 of exciter 27 thereby tends to decrease and the exciter accordingly increases its output voltage. Increased output voltage of exciter 27 results in a decrease in the excitation of winding 19ᵃ of motor 19, and thus a reduction in the C. E. M. F. of motor 19 to increase the current of the latter. However, when motor 19 reaches zero speed, its C. E. M. F. will revert to zero, regardless of the action of exciter 27, and current regulation by motor field control will, therefore, become ineffective. It is at this point that current regulation by generator voltage control takes effect.

By virtue of the connection of exciter 27 to winding 21ᵃ of generator 21, as shown in Fig. 1, exciter 27 in increasing its output voltage to decrease the excitation of field 19ᵃ of motor 19, increases its proportionate excitation to winding 21ᵃ of generator 21 to offset the reduction in the effect of the C. E. M. F. of the motor. Thus, with motor 19 at rest, exciter 27 effectively regulates, through control of excitation of winding 21ᵃ of generator 21, to insure that motor 19 will exert stalled torque on reel 13 and thereby maintain the desired value of tension on material 10 with reel 13 at rest. It will be appreciated that exciter 27 will regulate in like manner to provide such regulation in the zero speed region when accelerating the mill motor 14 from rest to a preset speed.

Fig. 2 graphically depicts how in the system of Fig. 1 exciter 27 acts to jointly regulate the strength of field 19ᵃ of motor 19 and the output voltage of generator 21. For given settings of the rheostats 26 and 32, the curve A represents the variation in flux of motor 19 afforded by the action of exciter 27, while the slanting line B represents the variation in output voltage of generator 21 afforded by exciter 27. The intersection of the broken vertical line C with curve A and line B may be assumed to depict the condition of an empty reel, while the intersection of the broken vertical line D with curves A and B may be assumed to depict the condition of a full reel. Thus as a reeling operation progresses, under steady state conditions within the limits of lines C and D, the flux of motor 19 would increase in accordance with the curve A, while the output voltage of generator 21 would decrease in accordance with the line B due to the regulating action of exciter 27. If at a condition of a full reel, mill motor 14 is decelerated to rest, then exciter 27 will function to decrease the flux of motor 19 and increase the output voltage of generator 21 to the respective stabilized values depicted by the intersection of the broken vertical line E with curve A and line B. These stabilized values of motor flux and generator output voltage obtain at stalled conditions of motor 19, and exciter 27 regulates to such values whenever the output voltage of tachometer generator 23 is zero.

Shifting the mechanically coupled adjusting elements of rheostats 26 and 32 in the counterclockwise direction from that depicted in Fig. 1 will effect an increase in the current which exciter 27 regulates to maintain, both during steady state reeling operations and under stalled condition of motor 19. Slanting line device B′ indicates how the output voltage of generator 21 would vary following a given repositioning of the adjusting element of rheostat 26 in the counterclockwise direction. It will be appreciated that for any given reel diameter exciter 27 will thus regulate to maintain a higher value of current in the loop circuit of the armatures of motor 19 and generator 21. The same holds true under stalled conditions of motor 19, as depicted by the intersection of vertical line E with curves A and B′. Conversely, exciter 27 will regulate to maintain lower values of running and stalled current by motor

5

19 when the adjusting element of rheostats 26 and 32 are repositioned in the clockwise direction from that shown in Fig. 1. Slanting line curve B'' indicates how the output voltage of generator 21 would vary following a given repositioning of the adjusting element of rheostat 26 in the clockwise direction.

Referring to Fig. 3, it shows a modified form of control system affording the same type of control as hereinbefore described. The control system depicted in Fig. 3 is in many respects similar to that shown in Fig. 1 and corresponding components bear the same reference numerals. The modified control system dispenses with the tachometer generator 23 and rheostat 26.

More particularly, field winding 17a of generator 17 is connected at one end to one side of source 15 and at its other end to an adjusting element of a potentiometer rheostat 40, which has its resistance element connected across opposite sides of source 15. The adjusting element of rheostat 40 is mechanically coupled to the adjusting elements of rheostats 41a and 41b of a compound rheostat set 41. The resistance element of rheostat 41a is connected across opposite sides of source 15 and its adjusting element is electrically connected to the midpoint on the resistance element of rheostat 41b. The adjusting element of rheostat 41b is connected to one end of field winding 21a of generator 21, which field winding is connected at its opposite end to one side of source 15 in series with a resistor 42.

Rheostat set 41 is of the type disclosed in my copending application Serial No. 117,655, filed September 24, 1949, now Patent 2,634,386, having the resistance elements of rheostats 41a and 41b complementally formed so that for any positioning of the adjusting elements the equivalent resistance of the rheostat set in the circuit aforedescribed will be constant. Reference should be made to the aforementioned copending application for a more complete understanding of the design and electrical characteristics of rheostat set 41.

Reference field winding 31 of exciter 27 is connected at one end to one side of supply source 15 and at its other end to the adjusting element of a rheostat 43, which has its resistance element connected across source 15. The adjusting element of rheostat 43 is mechanically coupled to the adjusting elements of rheostats 44a and 44b of a compound rheostat set 44, which is similar to the rheostat set 41. The resistance element of rheostat 44a is connected across the armature terminals of exciter 27 and its adjusting element is electrically connected to the adjusting element of rheostat 44b. Rheostat 44b has the midpoint of its resistance element electrically connected in series with a resistor 45 to a point common to the connection between field winding 21a of generator 21 and the adjusting element of rheostat 41b of rheostat set 41.

It will be apparent that rheostat set 41, because of its mechanical connection with rheostat 40 will provide an energizing output voltage to winding 21a of generator 21 in direct proportion to the voltage and speed of mill motor 14, and that the output voltage thereof will decrease to zero when motor 14 is decelerated to rest by deenergization of the field winding 17a and a reduction to zero of the voltage of generator 17. For the adjustments of rheostat 43 and rheostat set 44 shown, the output voltage of generator 21 may be assumed to vary according to the curve B of Fig. 2 during a reeling operation and stabilize

6 at the value depicted by the intersection of the vertical line E therewith under stalled conditions of motor 19. Shifting of the adjusting elements of rheostat 43 and rheostat set 44 in the counterclockwise direction will increase the output voltage of generator 21 at any reel diameter and at stalled conditions of motor 14, such as for example in accordance with curve B' of Fig. 2. Thus with such counterclockwise readjustment of the adjusting elements of rheostat 43 and rheostat set 44, exciter 27 will act to provide increase in torque of motor 19, both during reeling and at stalled condition of motor 19. Conversely shifting of the adjusting elements of rheostat 43 and rheostat set 44 in the clockwise direction will effect decrease in the output voltage of generator 21 at any reel diameter and at stalled condition of motor 19, such as, for example, in accordance with curve B'' of Fig. 2. Thus, with such clockwise readjustment of the adjusting elements of rheostat 43 and rheostat set 44, exciter 27 will act to provide decrease in torque of motor 19, both during reeling and at stalled condition of motor 19.

I claim:

1. In combination, an electric motor, a generator having its armature connected in a loop circuit with the armature of said motor, a constant excitation voltage source in circuit with the field winding of said motor, a second motor, means in circuit with a field winding of said generator for supplying the latter with an excitation voltage proportional to the speed of said second motor, and a regulator comprising an exciter having a control field winding connected to be responsive to the armature current of the first mentioned motor, said exciter having its armature connected to the field winding of said first mentioned motor in bucking relation to said source, and also having its armature connected in circuit with the aforementioned field winding of said generator to supply the latter with an excitation voltage proportional to the output voltage of said exciter.

2. In combination, an electric motor, a generator having its armature connected in a loop circuit with the armature of said motor, a constant excitation voltage source in circuit with the field winding of said motor, a second motor, a generator driven by said second motor and connected in circuit with a field winding of the first mentioned generator for supplying the latter with an excitation voltage proportional to the speed of said second motor, and a regulator comprising an exciter having a control field winding connected to be responsive to the armature current of the first mentioned motor, said exciter having its armature connected to the field winding of said first mentioned motor in bucking relation to the source, and also having its armature connected in circuit with the aforementioned field winding of said first mentioned generator for supplying the latter with an excitation voltage proportional to the output voltage of said exciter.

3. In combination, an electric motor, a generator having its armature connected in a loop circuit with the armature of said motor, a constant excitation voltage source in circuit with the field winding of said motor, a second motor, a generator drivin by said second motor, a pair of resistors connected in series circuit with the last mentioned generator and the field winding of the first mentioned generator for supplying the latter with an excitation voltage proportional to the speed of said second motor, and a regulator comprising an exciter having a control field winding connected to be responsive to the armature current of the first mentioned motor, said exciter having its armature connected to said field winding of said first mentioned motor in bucking relation to said source, and also having its armature connected to the point common between said resistors for supplying said field winding of said first mentioned generator with an excitation voltage proportional to the output voltage of said exciter.

4. In combination, an electric motor, a generator having its armature connected in a loop circuit with the armature of said motor, a constant excitation voltage source in circuit with the field winding of said motor, a second motor, a generator driven by said second motor, first and second resistors connected in series between one terminal of the last mentioned generator and the field winding of the first mentioned generator and affording supply of the latter with an excitation voltage proportional to the speed of said second motor, a potentiometer rheostat having its resistance element connected across said source and having its adjusting element connected to the point common between said one terminal of said last mentioned generator and said first resistor, a second rheostat having its adjusting element mechanically coupled to the adjusting element of said potentiometer rheostat, and an exciter comprising a control field winding connected to be responsive to the armature current of the first mentioned motor, and another field winding in circuit with said source and said second rheostat, said exciter having its armature connected to said field winding of said first mentioned motor in bucking relation to said source, and also having its armature connected to the point common between said first and second resistors for supplying said field winding of said first mentioned generator with an excitation voltage proportional to the output voltage of said exciter.

5. In combination, an electric motor, a generator having its armature connected in a loop circuit with the armature of said motor, a constant excitation voltage source in circuit with the field winding of said motor, a second motor, a regulator comprising an exciter having a control field winding connected to be responsive to the armature current of the first mentioned motor and having its armature connected to the field winding of said first mentioned motor in bucking relation to said source, and a network in circuit with the field winding of said generator comprising a first compound rheostat set for supplying the latter field winding with an excitation voltage proportional to the speed of said second motor, said network further comprising a second compound rheostat set in circuit with the armature of said exciter and said field winding of said generator for supplying the latter with an excitation voltage proportional to the output of said exciter.

6. In combination, an electric motor, a generator having a single field winding and having its armature connected in a loop circuit with the armature of said motor, a constant excitation voltage source in circuit with the field winding of said motor, a second motor, means in circuit with said field winding of said generator for supplying the latter with an excitation voltage proportional to the speed of said second motor, and a regulator comprising an exciter having a control field winding connected to be responsive to the armature circuit of the first mentioned motor, said exciter having its armature connected to the field winding of said first mentioned motor in bucking relation to said source, and also having its armature connected in circuit with said generator field winding to supply the latter with an excitation voltage proportional to the output voltage of said exciter.

7. In combination, an electric motor, a generator having its armature connected in a loop circuit with the armature of said motor and providing the sole source of armature voltage therefor, a constant excitation voltage source in circuit with the field winding of said motor, a second motor, means in circuit with a field winding of said generator for supplying the latter with an excitation voltage proportional to the speed of said second motor, and a regulator comprising an exciter having a control field winding connected to be responsive to the armature current of the first mentioned motor, said exciter having its armature connected to the field winding of the first mentioned motor in bucking relation to said constant excitation voltage source, and also having its armature connected in circuit with the aforementioned field winding of said generator to supply the latter with an excitation voltage proportional to the output voltage of said exciter.

8. In combination, an element for working on a strip of material, a first electric motor for driving said element, a reel for said material, a second electric motor for driving said reel, a generator having its armature connected in a loop circuit with the armature of said second motor, a constant excitation voltage source in circuit with the field winding of said second motor, means in circuit with the field winding of said generator for supplying the latter with an excitation voltage proportional to the speed of said first motor, and a regulator comprising an exciter having a control field winding connected to be responsive to the armature current of said second motor, said exciter having its armature connected to the field winding of said second motor in bucking relation to said source, and also having its armature connected in circuit with the aforementioned field winding of said generator to supply the latter with an excitation voltage proportional to the output voltage of said exciter.

ERIC PELL.

References Cited in the file of this patent
UNITED STATES PATENTS

| Number | Name | Date |
|---|---|---|
| 2,444,248 | Crever | June 29, 1948 |
| 2,454,183 | Kenyon | Nov. 16, 1948 |
| 2,462,171 | Erbe et al. | Feb. 22, 1949 |